(12) United States Patent
Miyata

(10) Patent No.: US 10,528,309 B2
(45) Date of Patent: Jan. 7, 2020

(54) INFORMATION PROCESSING APPARATUS AND PRINT CONTROL METHOD

(71) Applicant: KYOCERA Document Solutions Inc., Osaka (JP)

(72) Inventor: Rie Miyata, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/333,073

(22) PCT Filed: May 17, 2018

(86) PCT No.: PCT/JP2018/019031
§ 371 (c)(1),
(2) Date: Mar. 13, 2019

(87) PCT Pub. No.: WO2019/003691
PCT Pub. Date: Jan. 3, 2019

(65) Prior Publication Data
US 2019/0265927 A1 Aug. 29, 2019

(30) Foreign Application Priority Data
Jun. 30, 2017 (JP) .................................. 2017-129226

(51) Int. Cl.
*G06F 3/12* (2006.01)
(52) U.S. Cl.
CPC .............. *G06F 3/1256* (2013.01); *G06F 3/12* (2013.01); *G06F 3/1208* (2013.01); *G06F 3/1252* (2013.01)

(58) Field of Classification Search
CPC ........ G06F 3/1256; G06F 3/12; G06F 3/1208; G06F 3/1252
See application file for complete search history.

(56) References Cited

U.S. PATENT DOCUMENTS

2008/0002214 A1* 1/2008 Xu ..................... G03G 15/5095
358/1.1
2019/0347053 A1* 11/2019 Aoyama ................. G06F 3/125

FOREIGN PATENT DOCUMENTS

| JP | H05-58007 A | 3/1993 |
|----|-------------|--------|
| JP | H07-66962 A | 3/1995 |
| JP | H08-282051 A | 10/1996 |
| JP | H09-69089 A | 3/1997 |

(Continued)

*Primary Examiner* — Iriana Cruz
(74) *Attorney, Agent, or Firm* — IP Business Solutions, LLC

(57) ABSTRACT

An information processing apparatus includes a print controller that outputs image data to a printing apparatus to print an image representing the image data, and an image processor that executes, with respect to the image data that requires two or more printing pages because the printed image protrudes from a first of the printing pages, a processing including separating a part of the image protruding from the first of the printing pages, from a fitted part of the image that can be fitted in the first of the printing pages, dividing the separated image into image segments according to a length of the fitted part of the image, and sequentially aligning the divided image segments parallel to the fitted part of the image. The print controller outputs the image data processed by the image processor to the printing apparatus, to print the image representing the image data.

13 Claims, 13 Drawing Sheets

(56) References Cited

FOREIGN PATENT DOCUMENTS

| JP | 2003-208279 A | 7/2003 |
| JP | 2007-160729 A | 6/2007 |
| JP | 2013-075420 A | 4/2013 |

* cited by examiner

Fig.2A

| ROW/COLUMN 1 | COLUMN 2 | COLUMN 3 | COLUMN 4 | ... | COLUMN 198 | COLUMN 199 | COLUMN 200 |
|---|---|---|---|---|---|---|---|
| ROW 2 | 2002 | 3002 | 4002 | ... | 198002 | 199002 | 200002 |
| ROW 3 | 2003 | 3003 | 4003 | ... | 198002 | 199003 | 200003 |

| ROW/COLUMN 1 | COLUMN 2 | COLUMN 3 |
|---|---|---|
| ROW 2 | 2002 | 3002 |
| ROW 3 | 2003 | 3003 |
| ROW 4 | 2004 | 3004 |
| ROW 5 | 2005 | 3005 |
| ROW 6 | 2006 | 3006 |
| ⋮ | ⋮ | ⋮ |
| ROW 196 | 2196 | 3196 |
| ROW 197 | 2197 | 3197 |
| ROW 198 | 2198 | 3198 |
| ROW 199 | 2199 | 3199 |
| ROW 200 | 2200 | 3200 |

T2

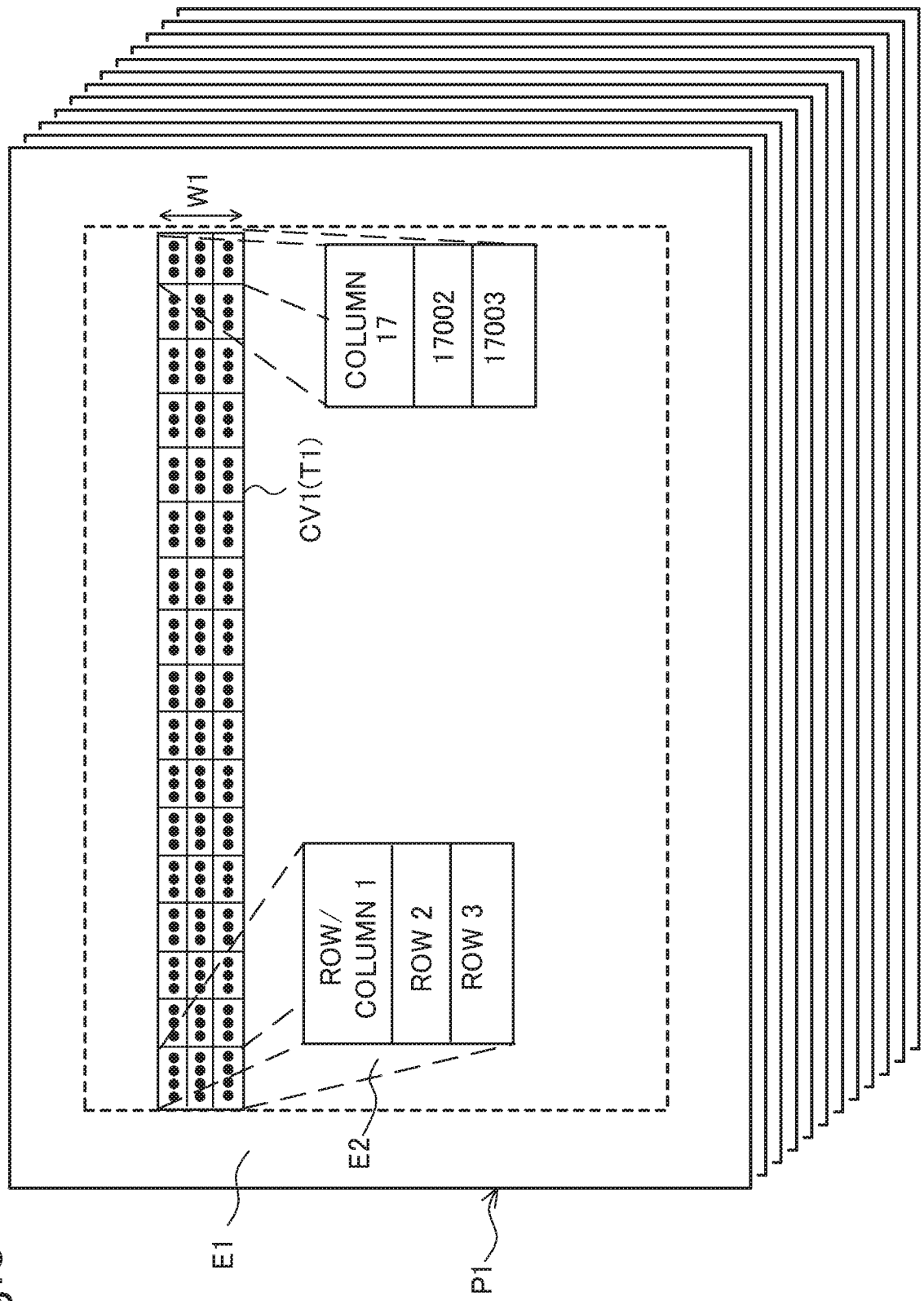

Fig.11

| ROW/COLUMN 1 | COLUMN 2 | COLUMN 3 | COLUMN 4 | | COLUMN 15 | COLUMN 16 | COLUMN 17 |
|---|---|---|---|---|---|---|---|
| ROW 2 | 2002 | 3002 | 4002 | | 15002 | 16002 | 17002 |
| ROW 3 | 2003 | 3003 | 4003 | | 15003 | 16003 | 17003 |

CV1 points into the top table. G1 labels the top table.

| COLUMN 17 | COLUMN 18 | COLUMN 19 | COLUMN 20 | | COLUMN 31 | COLUMN 32 | COLUMN 33 |
|---|---|---|---|---|---|---|---|
| 17002 | 18002 | 19002 | 20002 | | 31002 | 32002 | 33002 |
| 17003 | 18003 | 19003 | 20003 | | 31003 | 32003 | 33003 |

G11, CV21, G2

| COLUMN 33 | COLUMN 34 | COLUMN 35 | COLUMN 36 | | COLUMN 47 | COLUMN 48 | COLUMN 49 |
|---|---|---|---|---|---|---|---|
| 33002 | 34002 | 35002 | 36002 | | 47002 | 48002 | 49002 |
| 33003 | 34003 | 35003 | 36003 | | 47003 | 48003 | 49003 |

G21, DV22

INFORMATION PROCESSING APPARATUS AND PRINT CONTROL METHOD

TECHNICAL FIELD

The present invention relates to an information processing apparatus and a print control method, and more particularly to a technique to execute printing with minimized waste of recording sheets.

BACKGROUND ART

A patent literature (PTL) 1 cited below discloses a technique to rotate or contract data of an image to be printed when, although the image looks fitted in one page on a computer screen, a part of the image protrudes out of the page of a medium (recording sheet) to the next page, so as to fit the data within one page of the medium.

CITATION LIST

Patent Literature

[PTL 1] Japanese Unexamined Patent Application Publication No. 2003-208279

SUMMARY OF INVENTION

In the case of making out a table using spreadsheet software such as Excel (registered trademark), the table may become elongate in a horizontal or vertical direction, upon being finished. When such an elongate image is printed as it is, at equal magnification, a large number of printed sheets are produced, on each of which the image is printed only in an upper or left-hand region of the sheet. Thus, a large number of wasteful and bad-looking sheets are produced.

Although PTL 1 cited above teaches rotating or contracting the data to be printed, the elongate image may not always be fitted in one page, as result of being rotated. In addition, when the image is contracted so as to be fitted in one page, the whole image may become illegibly small, which makes it difficult to secure the visibility of the image.

The present invention has been accomplished in view of the foregoing situation, and provides a technique to secure the visibility of an elongate image in a printed state, and to provide a good-looking printed sheet having a reduced blank portion, to the user.

Solution to Problem

In an aspect, the present invention provides an information processing apparatus, including: a first decider that decides whether a number of printed pages becomes equal to or more than two, because of an image representing image data designated by a user to be printed being unable to be fitted in a first of printing pages; an image processor that executes, with respect to the image data about which the first decider has decided that the number of printed pages becomes equal to or more than two, because of the image being unable to be fitted in the first of the printing pages, a processing including separating a part of the image protruding from the first of the printing pages, from a fitted part of the image that can be fitted in the first of the printing pages, dividing the separated image into image segments according to a length of the fitted part of the image, and including the image segments in the image to be printed on the printing page, by aligning the divided image segments parallel to the fitted part of the image; a notifier that notifies, when the first decider decides that the number of printed pages of the image data becomes equal to or more than two, the user to the same effect; an instruction receiver that receives an instruction to execute the processing with respect to the image data from the user, after the notifier outputs the notice; and a second decider that decides whether a width of the fitted part of the image is equal to or less than a predetermined ratio to an image forming region in the printing page. The image processor executes the processing with respect to the image data, when the instruction receiver has received the instruction to execute from the user. The notifier outputs the notice, when the second decider decides that the width of the fitted part of the image is equal to or less than the predetermined ratio to the image forming region in the printing page, but detains the notice when the second decider decides that the width of the fitted part of the image is not equal to or less than the predetermined ratio to the image forming region.

In another aspect, the present invention provides an information processing apparatus, including: a first decider that decides whether a number of printed pages becomes equal to or more than two, because of an image representing image data designated by a user to be printed being unable to be fitted in a first of printing pages; an image processor that executes, with respect to the image data about which the first decider has decided that the number of printed pages becomes equal to or more than two, because of the image being unable to be fitted in the first of the printing pages, a processing including separating a part of the image protruding from the first of the printing pages, from a fitted part of the image that can be fitted in the first of the printing pages, dividing the separated image into image segments according to a length of the fitted part of the image, and including the image segments in the image to be printed on the printing page, by aligning the divided image segments parallel to the fitted part of the image; a notifier that notifies, when the first decider decides that the number of printed pages of the image data becomes equal to or more than two, the user to the same effect; an instruction receiver that receives an instruction to execute the processing with respect to the image data from the user, after the notifier outputs the notice; and a third decider that decides whether a width of the part of the image protruding from the first of the printing pages is the same as a width of the fitted part of the image. The image processor executes the processing with respect to the image data, when the instruction receiver has received the instruction to execute from the user. The notifier detains the notice when the third decider decides that the width of the part of the image protruding from the first of the printing pages is not the same as the width of the fitted part of the image In still another aspect, the present invention provides a print control method including; deciding, as a first decision, whether a number of printed pages becomes equal to or more than two, because of an image representing image data designated by a user to be printed being unable to be fitted in a first of printing pages; executing, with respect to the image data about which it has been decided, as the first decision, that the number of printed pages becomes equal to or more than two, because of the image being unable to be fitted in the first of the printing pages, a processing including separating a part of the image protruding from the first of the printing pages, from a fitted part of the image that can be fitted in the first of the printing pages, dividing the separated image into image segments according to a length of the fitted part of the image, and including the image segments in the image to be printed on the printing page, by aligning the divided image segments parallel to the fitted part of the image; notifying, when it has been decided, as the first decision, that the number of printed pages of the image data becomes equal to or more than two, the user to the same effect; receiving an instruction to execute the processing with respect to the image data from the user, after the notice has been outputted in the notifying; and deciding, as a second decision, whether a width of the fitted part of the image is equal to or less than a predetermined ratio to an image forming region in the printing page. The processing with respect to the image data is executed in the executing the processing, when the instruction to execute has been received from the user in the receiving. In the notifying, the notice is outputted when it has been decided, as the second decision, that the width of the fitted part of the image is equal to or less than the predetermined ratio to the image forming region in the printing page, but detains the notice when it has been decided, as the second decision, that the width of the fitted part of the image is not equal to or less than the predetermined ratio to the image forming region.

Advantageous Effects of Invention

With the foregoing technique, when the image representing the image data designated by the user to be printed is unable to be fitted in the first of the printing pages, the part of the image protruding from the first of the printing pages is separated from the fitted part of the image that can be fitted in the first of the printing pages, the separated image is divided into image segments according to the length of the fitted part of the image, and the divided image segments are aligned parallel to the fitted part of the image. For example, when the image representing the image data designated by the user to be printed is an elongate image, the elongate image is divided into image segments, and such image segments are aligned in parallel, to be integrated into one page. Utilizing the image processed as above enables a good-looking printed sheet having a reduced blank portion to be provided to the user. In addition, the image that would otherwise be printed over a plurality of pages can be visually recognized in the same page, since the size of the image is not reduced, which facilitates the user to confirm the content of the image. Therefore, the visibility of the image can also be improved.

BRIEF DESCRIPTION OF DRAWINGS

FIGS. 2A and 2B are tables each showing an example of an elongate image, FIG. 2A showing a horizontally elongate table, and FIG. 2B showing a vertically elongate table.

FIG. 3 is a schematic drawing showing an example of printed sheets, on which the horizontally elongate table has been printed as it is, without processing of the image data.

FIG. 11 is a schematic drawing showing an example of a printed sheet, on which the horizontally elongate table has been printed after processing of the image data.

DESCRIPTION OF EMBODIMENTS

Figure 1:
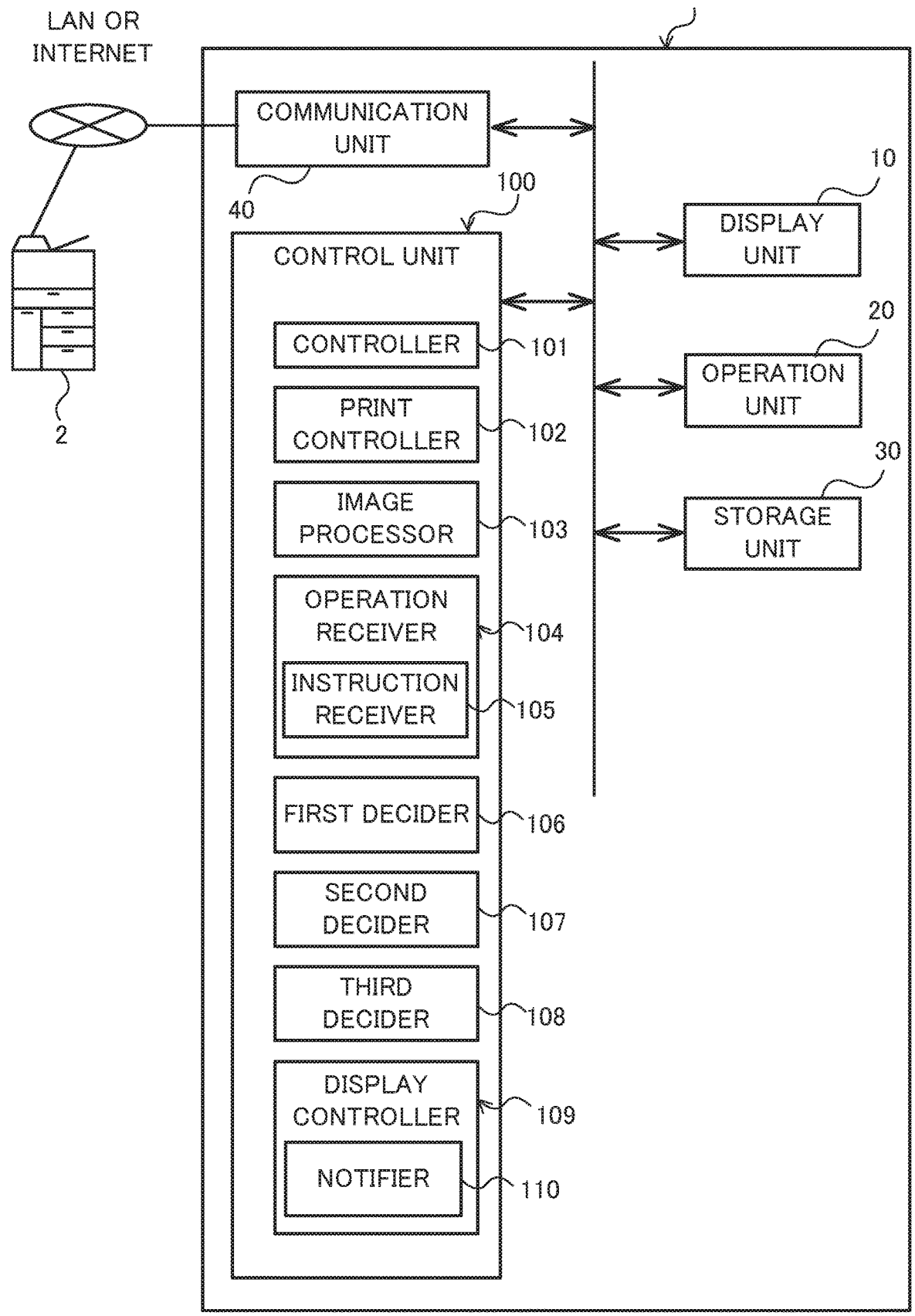
FIG. 1 is a functional block diagram showing an essential internal configuration of an information processing apparatus according to a first embodiment of the present invention.

Hereafter, an information processing apparatus, a print control program, and a print control method according to an embodiment of the present invention will be described, with reference to the drawings. FIG. 1 is a functional block diagram showing an essential internal configuration of the information processing apparatus according to a first embodiment of the present invention.

The information processing apparatus 1 according to the first Embodiment of the present invention is, for example, a personal computer. The information processing apparatus 1 includes an operation unit 10, a display unit 20, a storage unit 30, a communication unit 40, and a control unit 100. The mentioned components are configured to transmit and receive data and signals to and from each other, via a communication bus.

The operation unit 10 includes a keyboard, a mouse, and so forth, to be used to input a command or a character in the control unit 100, and to operate a pointer on the screen of the display unit 20. The display unit 20 displays a response from the control unit 100, and data results. The storage unit 30 is a storage device such as a hard disk drive (HDD), and stores therein programs and data necessary for the operation of the information processing apparatus 1.

The communication unit 40 is a communication interface, including a communication module such as a non-illustrated local area network (LAN) chip. The information processing apparatus 1 is connected to another electronic device via a network, and transmits and receives data to and from, for example, a printing apparatus 2 connected via the communication unit 40. The printing apparatus 2 is a multifunction peripheral configured to execute a plurality of functions including, for example, a copying function, a printing function, a scanning function, and a facsimile function.

The control unit 100 includes a processor, a random-access memory (RAM), a read-only memory (ROM), an exclusive hardware circuit, and so forth. The processor is, for example, a central processing unit (CPU), a micro processing unit (MPU), an application specific integrated circuit (ASIC), or the like. The control unit 100 includes a controller 101, a print controller 102, an image processor 103, an operation receiver 104, a first decider 106, a second decider 107, a third decider 108, and a display controller 109.

The control unit 100 acts as the controller 101, the print controller 102, the image processor 103, the operation receiver 104, the first decider 106, the second decider 107, the third decider 108, and the display controller 109, when the processor executes a print control program according to an embodiment of the present invention, stored in the storage unit 30. Here, the above-cited components of the control unit 100 may each be constituted in the form of a hardware circuit, instead of being performed according to the print control program. This also applies to other embodiments, unless otherwise specifically noted.

The controller 101 serves to control the overall operation of the information processing apparatus 1. The controller 101 is connected to the operation unit 10, the display unit 20, the storage unit 30, and the communication unit 40, and controls the operation of each of the cited components connected to the controller 101, and also transmits and receives signals and data, to and from each of the cited components.

The print controller 102 outputs image data stored for example in the storage unit 30 to the printing apparatus 2 through the communication unit 40, to thereby cause the printing apparatus 2 to print the image representing the image data.

The image processor 103 is configured to execute processings with respect to the image data stored in the storage unit 30 or another device. The image processor 103 executes, when the first decider 106 decides that an image representing image data designated by the user to be printed is unable to be fitted in the first of the printing pages, so that the number of printed pages becomes two or more, a processing including separating a part of the image protruding from the first of the printing pages, from the fitted part of the image that can be fitted in the first of the printing pages, dividing the separated image into image segments according to the length of the fitted part of the image (the length of the longer sides of the fitted part of the image; the length of the shorter sides may be referred to as width), and aligning the divided image segments parallel to the fitted part of the image, thereby including the image segments in the image to be printed on the printing page.

For example, the image processor 103 executes, with respect to an image that protrudes from the first of the printing pages, thereby making the number of printed pages two or more, when the corresponding image data is outputted to the printing apparatus 2 for printing, the processing including separating the part of the image protruding from the first of the printing pages, from the fitted part of the image CV1 or CH1 (see FIG. 3 and FIG. 4 to be subsequently referred to) that can be fitted in the first of the printing pages, dividing the separated image into the image segments according to the length of the fitted part of the image CV1 or CH1, and aligning the divided image segments parallel to the fitted part of the image CV1 or CH1 at predetermined intervals, thereby including the image segments in the image to be printed on the first page.

FIGS. 2A and 2B are tables each showing an example of an elongate image, FIG. 2A showing a horizontally elongate table, and FIG. 2B showing a vertically elongate table. The horizontally elongate table T1 shown in FIG. 2A represents data composed of 3 rows×200 columns, and the vertically elongate table T2 shown in FIG. 2B represents data composed of 200 rows×3 columns.

Figure 4:
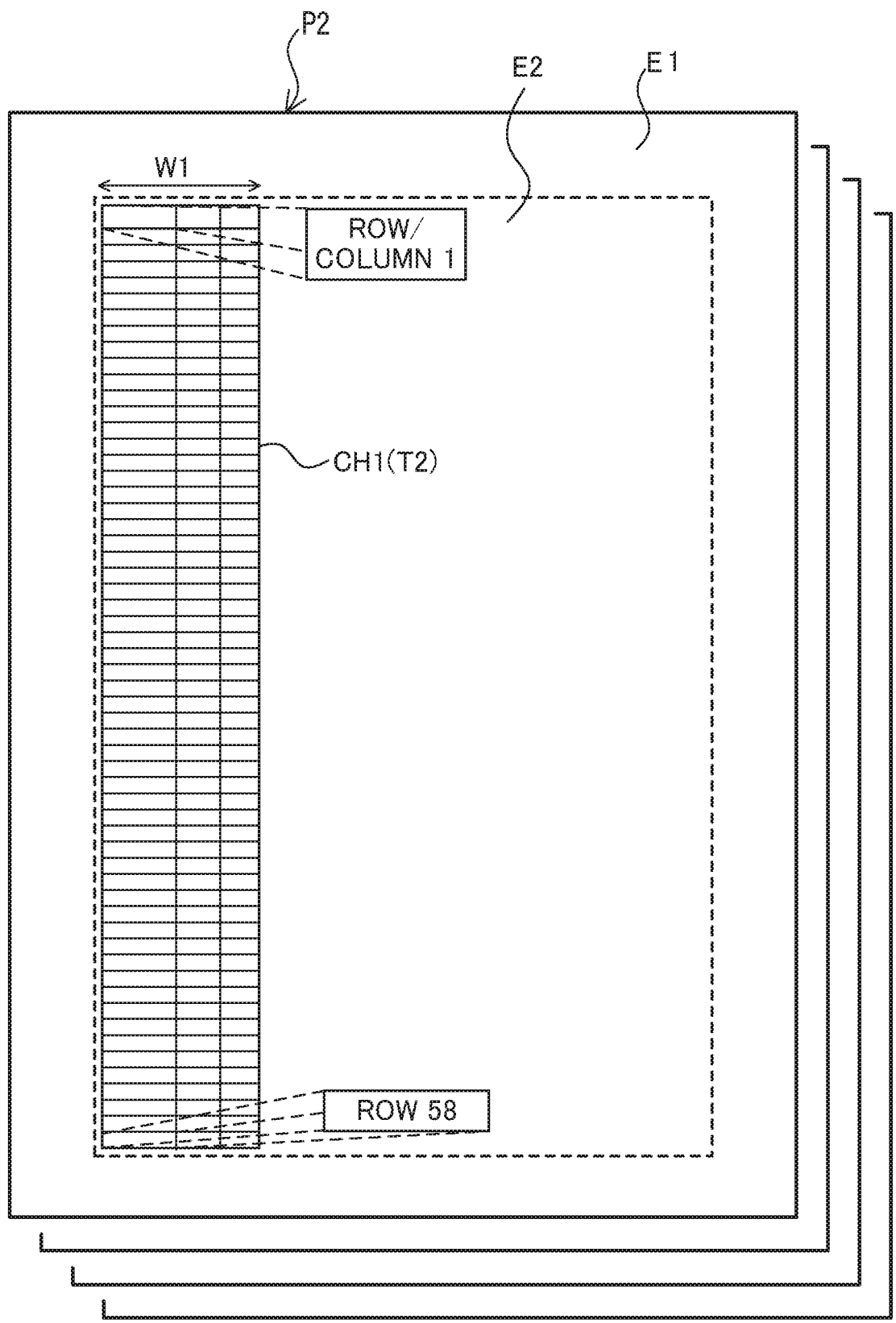
FIG. 4 is a schematic drawing showing an example of printed sheets, on which the vertically elongate table has been printed as it is, without processing of the image data.

FIG. 3 is a schematic drawing showing an example of printed sheets, on which the horizontally elongate table T1 has been printed as it is, without processing of the image data. FIG. 4 is a schematic drawing showing an example of printed sheets, on which the vertically elongate table T2 has been printed as it is, without processing of the image data.

When such an elongate image as Table T1 or T2 is printed as it is, without the image data being processed, the image protrudes from the first of the printing pages P1 or P2 (front page of the first recording sheet) as shown in FIG. 3 and FIG. 4, such that twelve pages are necessary to print Table T1, and four pages are necessary to print Table T2, which are both more than two pages. Here, a region around the rectangular region indicated by broke lines is a predetermined blank region E1, and the region inside the rectangle is an image forming region E2.

As shown in FIG. 3 and FIG. 4, when the elongate image is printed as it is, without the image data being processed, a large number of printed sheets are produced, on each of which the image is printed only in an upper or left-hand region of the sheet, with a large blank region left in the image forming region E2. Thus, a large number of wasteful and bad-looking sheets are produced.

Reference codes CV1 and CH1 in FIG. 3 and FIG. 4 respectively denote a fitted part of the image, which can be fitted inside the first of the printing pages P1 and P2. To be more detailed, the fitted part of the image CV1 represents the leading portion of Table T1 shown in FIG. 2A, including images of "Row/Column 1" and "Column 2" to "Column 17", and the fitted part of the image CH1 represents the leading portion of Table T2 shown in FIG. 2B, including images of "Row/Column 1" and "Row 2" to "Row 58".

Figure 5:
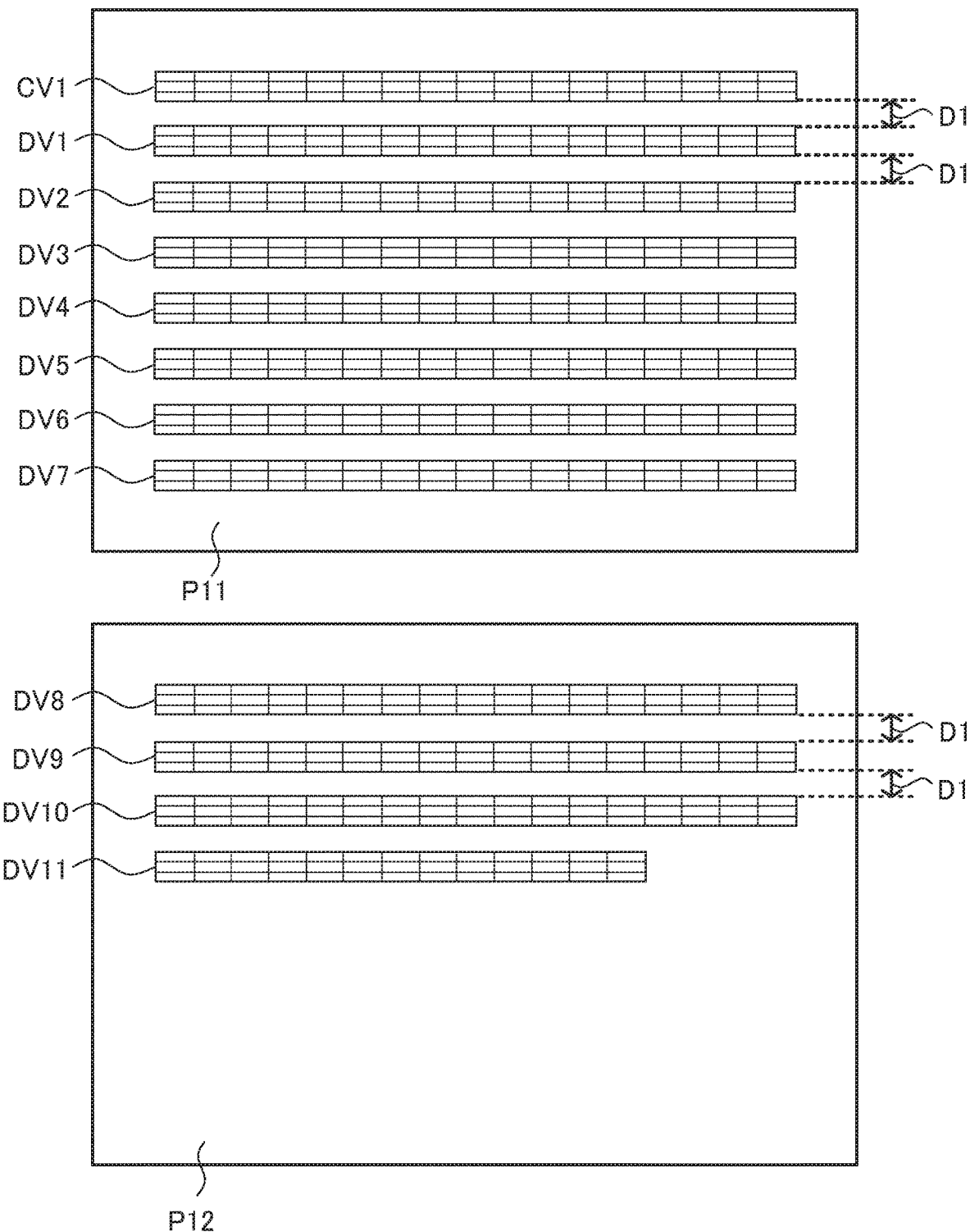
FIG. 5 is a schematic drawing showing an example of printed sheets, on which the horizontally elongate table has been printed after processing of the image data.

FIG. 5 is a schematic drawing showing an example of printed sheets, on which the horizontally elongate table T1 has been printed after processing of the image data. The part of the image protruding from the first of the printing pages P1 (FIG. 3), in other words the images of "Column 18" to "Column 200" shown in FIG. 2A, is separated from the fitted part of the image CV1, and the separated image is divided according to the length of the fitted part of the image CV1. For example, the image of "Column 18" to "Column 200" shown in FIG. 2A is divided into an image segment DV1 including "Column 18" to "Column 34", an image segment DV2 including "Column 35" to "Column 51", and so forth.

The divided image segments DV1 to DV11 are sequentially aligned parallel to the fitted part of the image CV1, at predetermined intervals D1. Then the fitted part of the image CV1 and the image segments DV1 to DV7 are printed on a printing page P11, and the image segments DV8 to DV11 are printed on a printing page P12.

Figure 6:
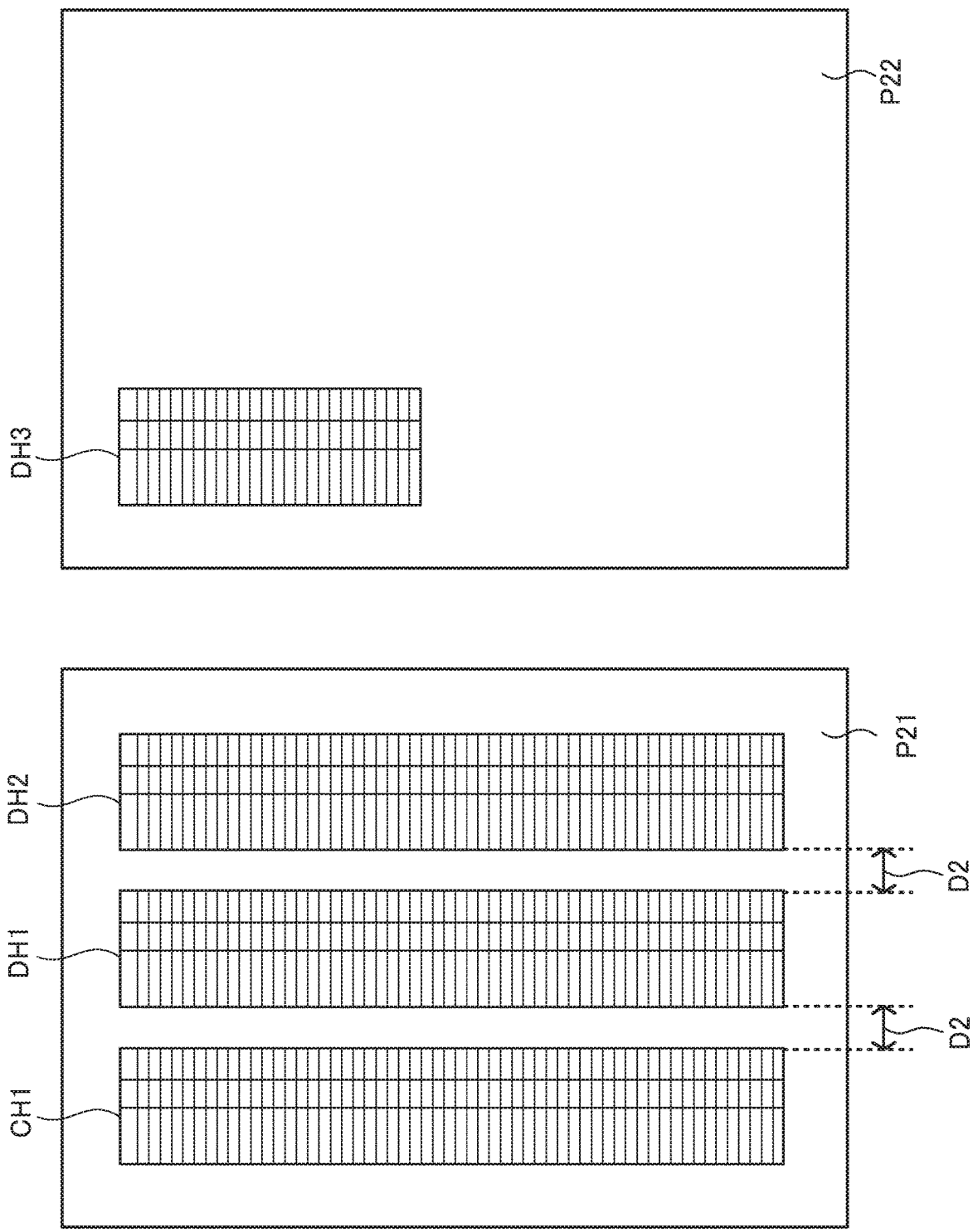
FIG. 6 is a schematic drawing showing an example of printed sheets, on which the vertically elongate table has been printed after processing of the image data.

FIG. 6 is a schematic drawing showing an example of printed sheets, on which the vertically elongate table T2 has been printed after processing of the image data. The part of the image protruding from the first of the printing pages P2 (FIG. 4), in other words the images of "Row 59" to "Row 200" shown in FIG. 2B, is separated from the fitted part of the image CH1, and the separated image is divided according to the length of the fitted part of the image CH1. For example, the image of "Row 59" to "Row 200" shown in FIG. 2B is divided into an image segment DH1 including "Row 59" to "Row 116", an image segment DH2 including "Row 117" to "Row 174", and an image segment DH3 including "Row 175" to "Row 200".

The divided image segments DH1 to DH3 are sequentially aligned parallel to the fitted part of the image CH1, at predetermined intervals D2. Then the fitted part of the image CH1 and the image segments DH1 and DH2 are printed on a printing page P21, and the image segment DH3 is printed on a printing page P22.

Here, the image processor 103 is also configured to contract the image, and to rotate the image for example by 90 degrees, in addition to dividing and aligning the image.

The operation receiver 104 receives instructions from the user inputted through the operation unit 10. For example, the operation receiver 104 receives an instruction from the user to print the image data stored in the storage unit 30. The operation receiver 104 includes an instruction receiver 105 for receiving the instruction to execute the mentioned processing.

The first decider 106 decides whether the number of printed pages becomes two or more, because of the image representing the image data designated by the user to be printed being unable to be fitted in the first of printing pages. For example, the first decider 106 compares the length of the image representing the image data with the length of the image forming region E2, on the basis of the image data designated by the user to be printed, to thereby decide whether the image representing the image data protrudes from the first of the printing pages, so that the number of printed pages of the image data becomes two or more. For example, the first decider 106 decides whether Table T1 shown in FIG. 2A protrudes from the printing page P1 (FIG. 3), so that the number of printed pages of Table T1 becomes two or more.

The second decider 107 decides whether the width of the fitted part of the image that can be fitted in the first of the printing pages is equal to or smaller than a predetermined ratio, with respect to the image forming region of the printing page. In this embodiment, for example, the second decider 107 sets the predetermined ratio to 1/2, and decides, on the basis of the corresponding image data, whether the width W1 of the fitted part of the image that can be fitted in the first of the printing pages (the length of the shorter sides of the fitted part of the image; the length of the longer sides being referred to as length, when the image to be printed protrudes from the first of the printing pages) is 1/2 or less of the image forming region E2. For example, the second decider 107 decides whether the width W1 of the fitted part of the image CV1 (FIG. 3) is 1/2 or less of the image forming region E2 (FIG. 3).

Whereas the width W1 of the fitted part of the image CV1 shown in FIG. 3 is less than 1/2 of the image forming region E2, if the width W1 of the fitted part of the image CV1 were wider than 1/2 of the image forming region E2, the blank region in the image forming region E2 would become narrower, and therefore the image segments DV1 to DV7 would, unlike in FIG. 5, be unable to be printed in the printing page P11 on which the fitted part of the image CV1 is printed, which disables the image segments from being integrated. Thus, the second decider 107 serves to decide whether the image segments can be integrated.

The third decider 108 decides, on the basis of the corresponding image data, whether the width of the part of the image protruding from the first of the printing pages (the length of the longer sides of the protruding part of the image being referred to as length; the length of the shorter sides thereof being referred to as width) is the same as the width of the fitted part of the image. For example, the third decider 108 decides whether the width of the image of "Column 18" to "Column 200" protruding from the printing page P1 (FIG. 3) is the same as the width of the fitted part of the image CV1.

Whereas the width of the image of "Column 18" to "Column 200" shown in FIG. 2A is the same as the width of the fitted part of the image CV1, if the width of the image of "Column 18" to "Column 200" were not the same as the width of the fitted part of the image CV1, the image of "Column 18" to "Column 200" would be unable to be aligned, despite being separated from the fitted part of the image CV1 and divided into image segments, and therefore the image segments would be unable to be integrated. Thus, the third decider 108 also serves to decide whether the image segments can be integrated, like the second decider 107.

The display controller 109 controls the displaying operation of the display unit 20. The display controller 109 includes a notifier 110. The notifier 110 controls the notice to the user to the effect that the number of printed pages of the image data designated by the user to be printed becomes two or more, when the first decider 106 has thus decided.

When the second decider 107 decides that the width W1 of the fitted part of the image is not 1/2 or less of the image forming region E2, or when the third decider 108 decides that the width of the part of the image protruding from the first of the printing pages is not the same as the width of the fitted part of the image, the notifier 110 does not generate the mentioned notice. In other words, the notifier 110 does not generate the notice, when the image segments are unable to be integrated.

Figure 7:
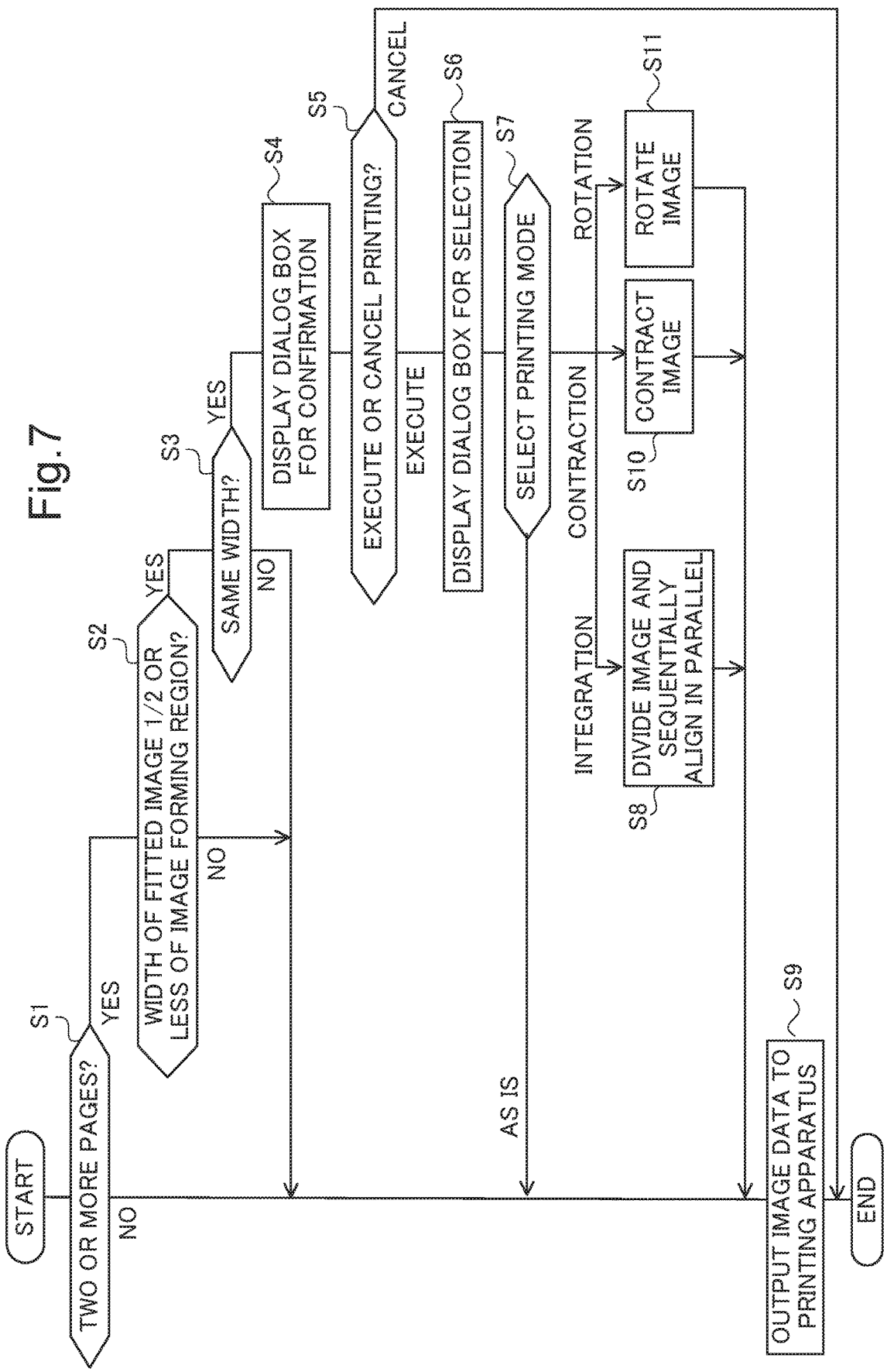
FIG. 7 is a flowchart showing an example of a process performed by the information processing apparatus 1 according to the first embodiment.

Hereunder, an example of the operation performed by the information processing apparatus 1 according to the first embodiment will be described, with reference to the flowchart shown in FIG. 7. This operation is performed when the operation receiver 104 receives the instruction to print the image data stored in the storage unit 30, from the user.

Upon deciding that the operation receiver 104 has received from the user the instruction to print the image data stored in the storage unit 30, the first decider 106 decides whether the image representing the image data designated by the user to be printed protrudes from the first of the printing pages (e.g., printing page P1 or P2), so that the number of printed pages of the image data becomes two or more (S1).

In the case where the first decider 106 decides that the number of printed pages of the image data becomes two or more (YES at S1), the second decider 107 decides whether the width W1 of the fitted part of the image that can be fitted in the first of the printing pages (e.g., fitted part of the image CV1 or CH1) is 1/2 or less of the image forming region E2 of the printing page (S2).

In the case where the second decider 107 decides that the width W1 of the fitted part of the image that can be fitted in the first of the printing pages is 1/2 or less of the image forming region E2 of the printing page (YES at S2), the third decider 108 decides whether the width of the part of the image protruding from the first of the printing pages is the same as the width of the fitted part of the image (S3).

In the case where the third decider 108 decides that the width of the protruding part of the image is the same as the width of the fitted part of the image (YES at S3), the notifier 110 of the display controller 109 notifies the user to the effect that the number of printed pages of the image data designated by the user becomes two or more, and causes the display unit 20 to display a dialog box for confirmation DB1 (see FIG. 8) for urging the user to decide whether the printing is to be executed (S4).

Figure 8:
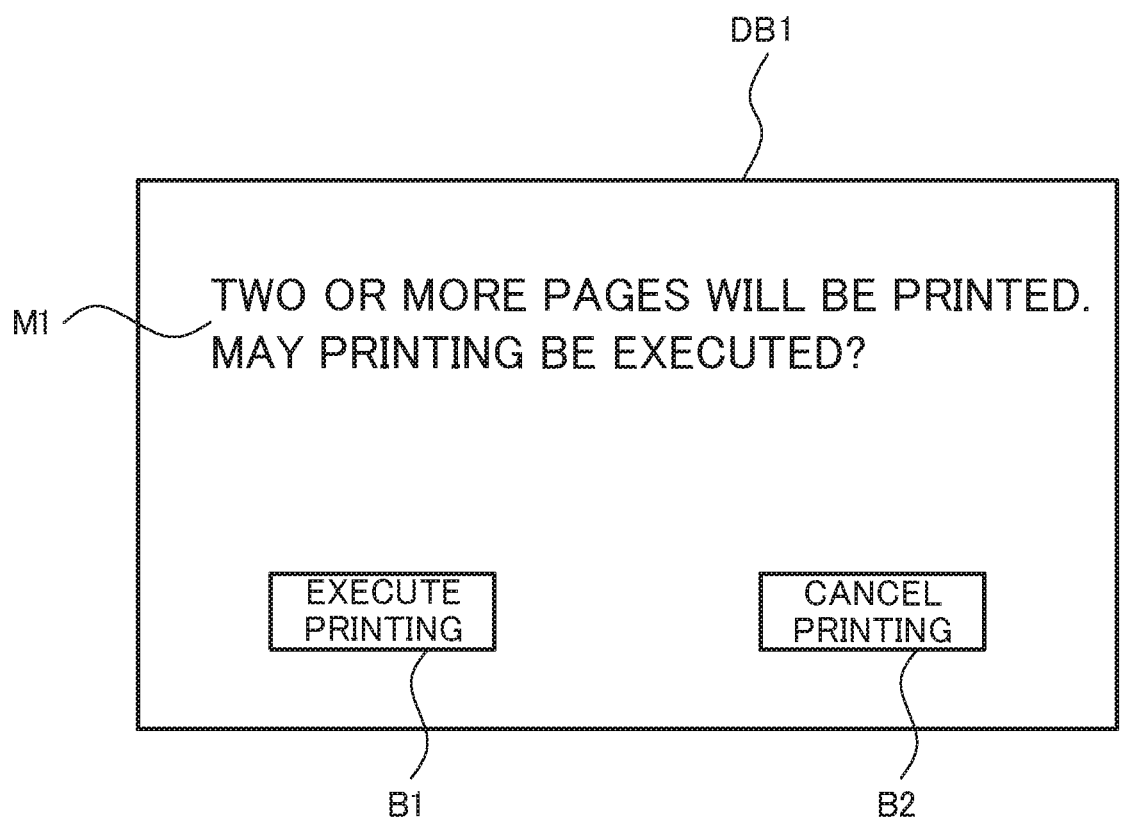
FIG. 8 is a schematic drawing showing an example of a dialog box for confirmation, displayed on a display unit.

FIG. 8 is a schematic drawing showing an example of the dialog box for confirmation, displayed on the display unit 20. The dialog box for confirmation DB1 includes such a message M1 as "Two or more pages will be printed. May printing be executed?", as well as a print execution button B1 showing "Execute printing" for inputting the printing instruction of the user, and a print cancel button B2 showing "Cancel printing" for inputting the cancellation of the printing.

Then the display controller 109 decides which of the print execution button B1 and the print cancel button B2 has been selected by the user through the operation receiver 104, by means of the touch panel function of the display unit 20 (S5). Upon deciding that the operation receiver 104 has received the user's selection of the print execution button B1 ("Execute" at S5), the display controller 109 causes the display unit 20 to display a dialog box for selection DB2 (see FIG. 9) for urging the user to select a printing mode (S6). In contrast, upon deciding that the operation receiver 104 has received the user's selection of the print cancel button B2 ("Cancel" at S5), the display controller 109 finishes the operation.

Figure 9:
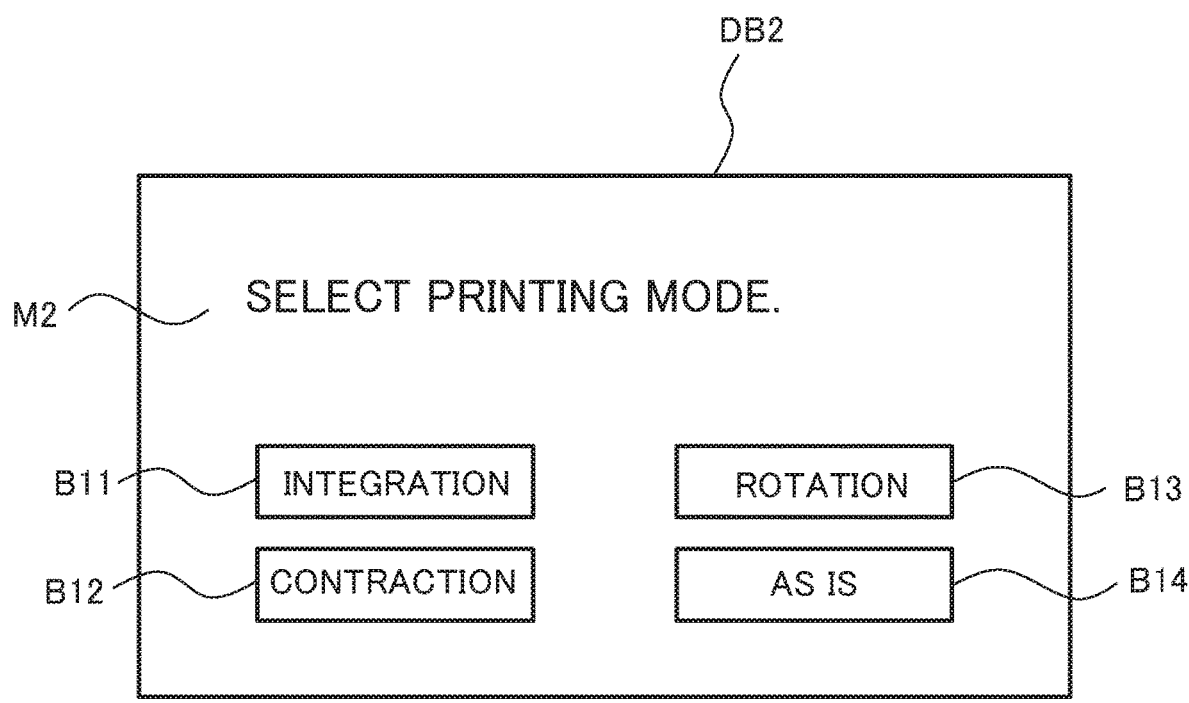
FIG. 9 is a schematic drawing showing an example of a dialog box for selection, displayed on the display unit.

FIG. 9 is a schematic drawing showing an example of the dialog box for selection, displayed on the display unit 20. The dialog box for selection DB2 includes such a message M2 as "Select printing mode", as well as a select button B11 showing "Integration", a select button B12 showing "Contraction", a select button B13 showing "Rotation", and a select button B14 showing "As is".

The image processor 103 decides which of the select buttons B11 to B14 in the dialog box for selection DB2 has been selected by the user through the operation receiver 104, by means of the touch panel function (S7).

Upon deciding that the operation receiver 104 has received the user's selection of the select button B11 ("Integration" at S7), the image processor 103 executes, with respect to the image data designated by the user, a processing including separating a part of the image protruding from the first of the printing pages, from the fitted part of the image that can be fitted in the first of the printing pages, dividing the separated image into the image segments according to the length of the fitted part of the image, and aligning the divided image segments parallel to the fitted part of the image at predetermined intervals as shown in FIG. 5 and FIG. 6, thereby including the image segments in the image to be printed on the printing page (S8).

Figure 13:
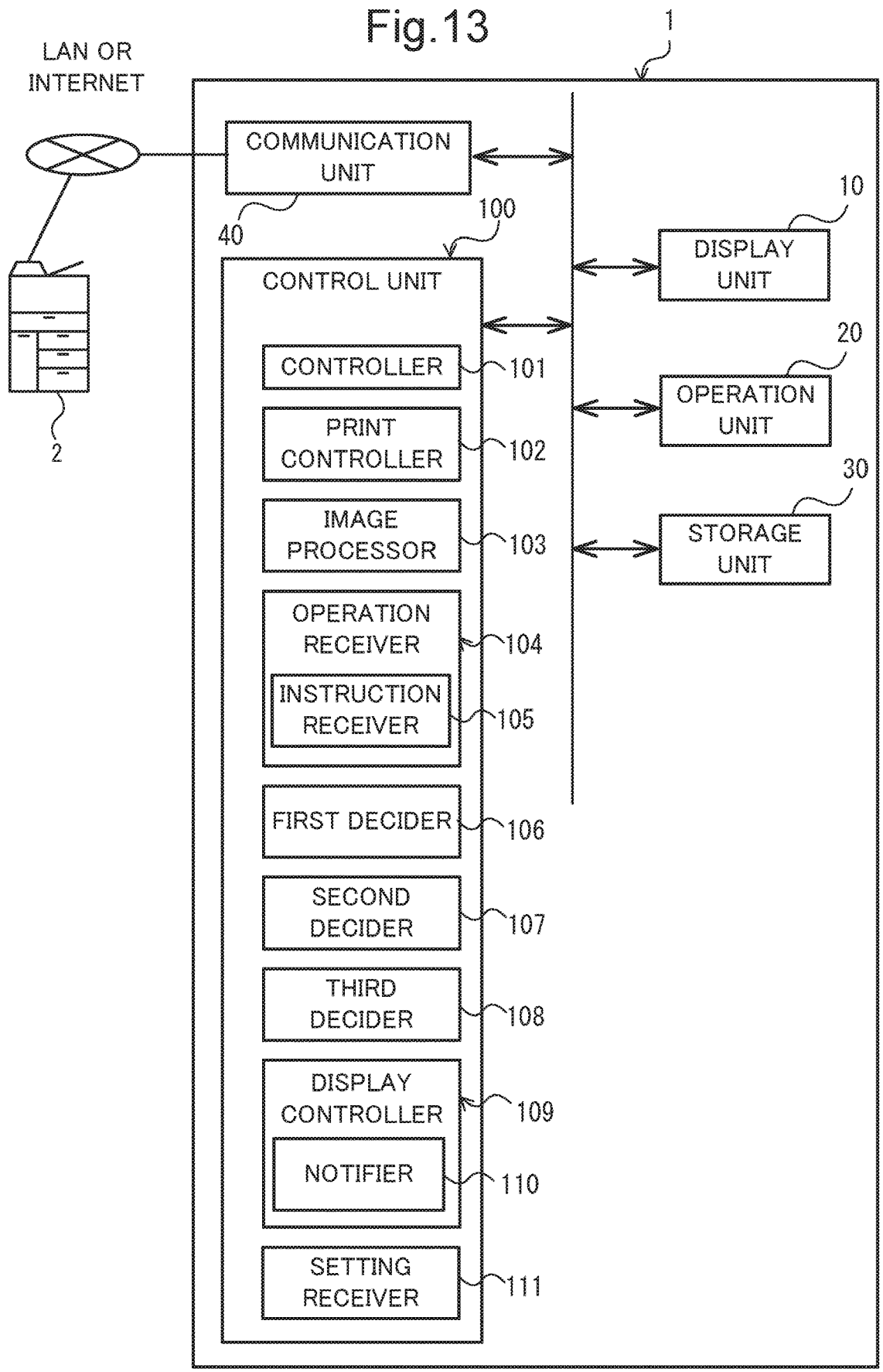
FIG. 13 is a functional block diagram showing an essential internal configuration of an information processing apparatus according to another embodiment.

Here, as another embodiment, the control unit 100 may include a setting receiver 111 (see FIG. 13) for receiving, through the operation unit 10, a user's setting of the interval D1 or D2 between the images aligned in parallel adjacent to each other, and the image processor 103 may execute the foregoing processing, with the interval set by the user and received by the setting receiver 111. In this case, the user can set the interval between the images, as desired.

Then the print controller 102 outputs the image data, subjected to the processing by the image processor 103, to the printing apparatus 2, thereby causing the printing apparatus 2 to execute the printing of the image representing the image data (S9). At this point, the operation is finished.

Upon deciding that the operation receiver 104 has received the user's selection of the select button B12 or the select button B13 ("Contraction" or "Rotation" at S7), the image processor 103 contracts, or rotates by 90 degrees, the image data designated by the user (S10, S11), and the operation proceeds to S9, where the print controller 102 outputs the image data subjected to the contraction or rotation, to the printing apparatus 2.

In contrast, upon deciding that the operation receiver 104 has received the user's selection of the select button B14 ("As is" at S7), the image processor 103 proceeds to S9, where the print controller 102 outputs the image data, designated by the user to be printed, to the printing apparatus 2, as it is.

In each of the cases where the first decider 106 decides that the number of printed pages of the image data is not two or more (NO at S1), where the second decider 107 decides that the size of the fitted part of the image that can be fitted in the first of the printing pages is not 1/2 or less of the image forming region E2 of the printing page (NO at S2), and where the third decider 108 decides that the width of the part of the image protruding from the first of the printing pages is not the same as the width of the fitted part of the image (NO at S3), the operation proceeds directly to S9.

With the configuration according to the first embodiment, the part of the image protruding from the first of the printing pages is separated from the fitted part of the image that can be fitted in the printing page, the separated image is divided into the image segments according to the length of the fitted part of the image, and the divided image segments are aligned parallel to the fitted part of the image, and included in the image to be printed on the printing page. Accordingly, for example, an elongate image to be printed can be divided and aligned, so as to be integrated into one of the printing pages. Utilizing the image processed as above enables a good-looking printed sheet having a reduced blank portion to be provided to the user. In addition, the image that would otherwise be printed over a plurality of pages can be visually recognized in the same page, since the size of the image is not reduced, which facilitates the user to confirm the content of the image. Therefore, the visibility of the image can also be improved.

Further, when the number of printed pages of the image data designated by the user to be printed becomes two or more, the user is notified to this effect, and provided with the opportunity to decide whether to execute the printing by integrating the images. Therefore, the user can select whether to execute the integration, on the basis of the user's own decision.

As a second embodiment, the image processor 103 may add, when executing the foregoing processing, an image visually indicating the continuity between the trailing end of a preceding image and the leading end of the following image, with respect to the images aligned in parallel adjacent to each other.

Figure 10:
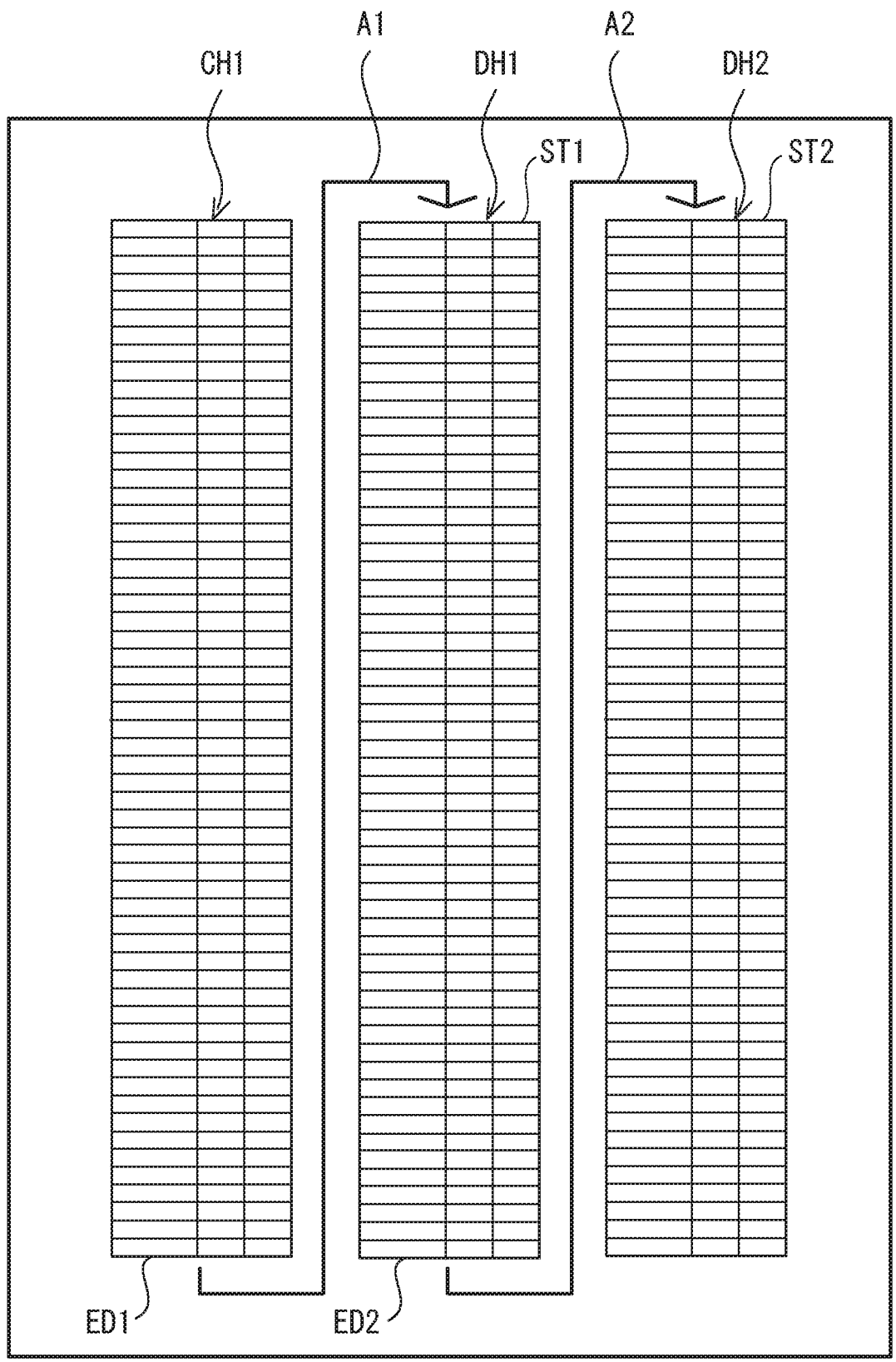
FIG. 10 is a schematic drawing showing an example of a printed sheet, on which the vertically elongate table has been printed after processing of the image data.

For example, as shown in FIG. 10, the image processor 103 may add an arrow image A1 visually indicating the continuity between the trailing end ED1 of the preceding image CH1 and the leading end ST1 of the image segment DH1 following the image CH1 and, likewise, an arrow image A2 visually indicating the continuity between the trailing end ED2 of the preceding image segment DH1 and the leading end ST2 of the image segment DH2 following the image segment DH1. Such an arrangement facilitates the continuity between the images aligned in parallel adjacent to each other to be visually recognized.

Further, as a third embodiment, the image processor 103 may copy, when executing the foregoing processing, the leading image or the trailing image of each of the images aligned in parallel, and add the copy of the leading image to the trailing end of the image preceding the leading image, and also add the copy of the trailing image to the leading end of the image following the trailing image.

For example, as shown in FIG. 11, the image processor 103 may copy a trailing image G1 corresponding to "Column 17" in the fitted part of the image CV1, and add the copied image G11 to the leading end of an image segment DV21 following the fitted part of the image CV1. Likewise, the image processor 103 may copy a trailing image G2 corresponding to "Column 33" in the image segment DV21, and add the copied image G21 to the leading end of an image segment DV22 following the image segment DV21. Alternatively, the image processor 103 may process the copied images G11 and G21 so as to facilitate visual distinction from the original trailing images G1 and G2, for example increasing or decreasing the density from the original image, or changing the color. In this case, the continuity between the images can be maintained, even when the images are separated.

Still further, as a fourth embodiment, the image processor 103 may add, when executing the foregoing processing, an image indicating which part in the entirety of the original image each of the image segments aligned in parallel corresponds to, at a predetermined position with respect to each of the image segments, for example a position in the vicinity of, adjacent to, or beside the corresponding image segment.

Figure 12:
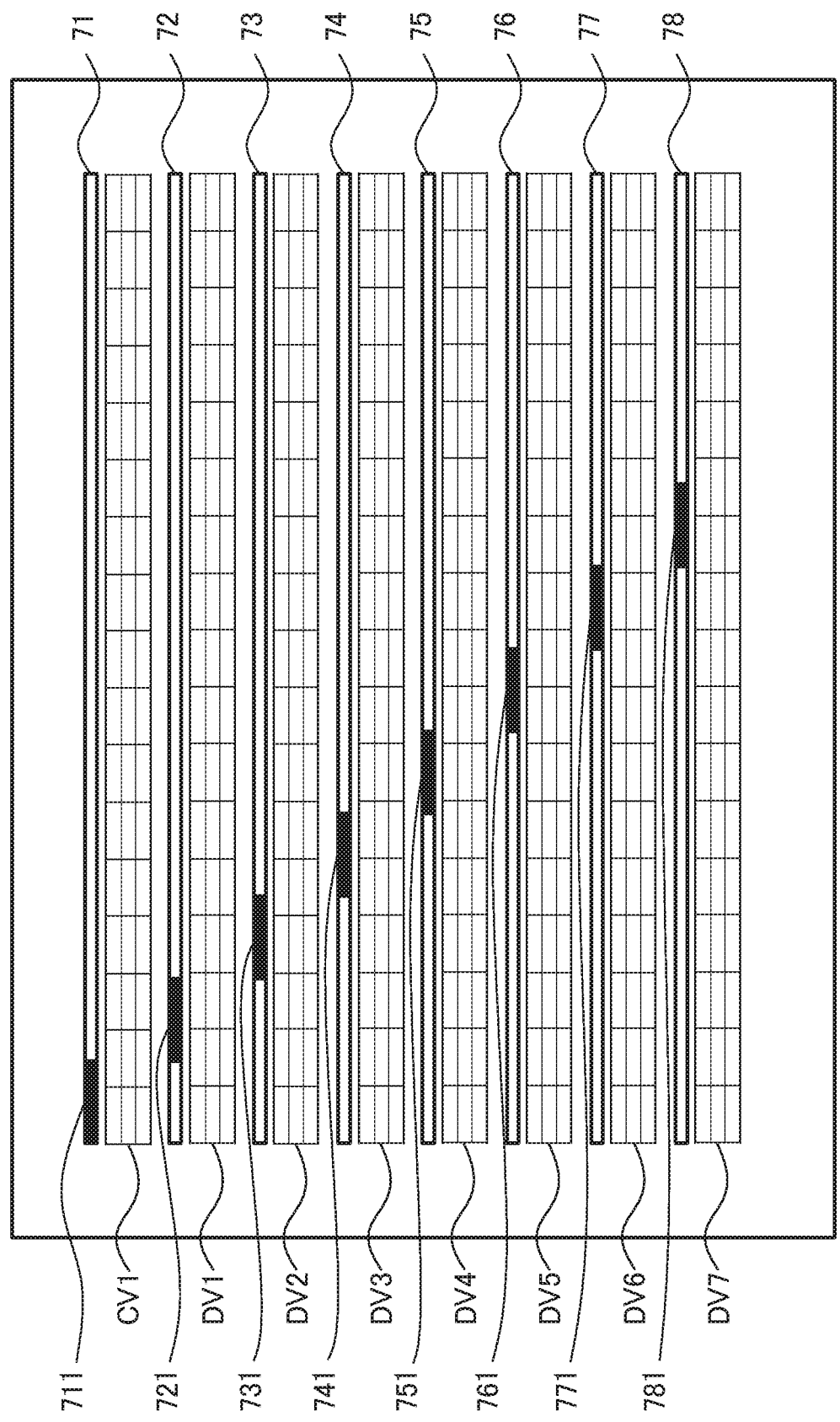
FIG. 12 is a schematic drawing showing another example of a printed sheet, on which the horizontally elongate table has been printed after processing of the image data.

For example, as shown in FIG. 12, the image processor 103 may add belt-like images 71 to 78, respectively indicating which part in Table T1 (see FIG. 2A), which is the entire image before being separated, the fitted part of the image CV1 and the image segments DV1 to DV7 correspond to, at a predetermined position with respect to each of the fitted part of the image CV1 and the image segments DV1 to DV7, for example a position in the vicinity of, adjacent to, or beside the fitted part of the image CV1 and the image segments DV1 to DV7.

The transverse width of the belt-like images 71 to 78 corresponds to the entirety of the transverse length of the Table T1, and guide images 711 to 781 blackened in the respective belt-like images 71 to 78 indicate which part in the entirety of Table T1 in the transverse direction the fitted part of the image CV1 and the image segments DV1 to DV7 each correspond to. Such an arrangement facilitates the user to recognize in which part of the entirety of Table T1 in the transverse direction the data represented by the fitted part of the image CV1 and the image segments DV1 to DV7 is located.

As shown in FIG. 12, the fitted part of the image CV1 includes "Row/column 1" and "Column 1" to "Column 17" in the leading section of Table T1, which corresponds to 17/200 of the entirety of Table T1. Accordingly, the image processor 103 generates the belt-like image 71 including the guide image 711, blackened over a range from the left end to the point advanced by 17/200, and places the belt-like image 71 on the upper side of the fitted part of the image CV1. Likewise, since the image segment DV1 is the portion following the fitted part of the image CV1 and has a length corresponding to 17/200 of the entirety of Table T1, the image processor 103 generates the belt-like image 72 including the guide image 721, blackened over a range from the point advanced by 17/200 from the left end to the point advanced by another 17/200, and places the belt-like image 72 on the upper side of the image segment DV1. Such an arrangement facilitates the user to recognize which part of the entire image each of the image segment corresponds to.

The present invention is in no way limited to the foregoing embodiments but may be modified in various manners. In addition, although the information processing apparatus according to the present invention is exemplified by a personal computer in the embodiments, the information processing apparatus may be a tablet terminal, a smartphone, or the like.

The configurations and processings according to the embodiments, described with reference to FIG. 1 to FIG. 12, are merely exemplary and in no way intended to limit the present invention to those configurations and processings.

The invention claimed is:

1. An information processing apparatus comprising:
a first decider that decides whether a number of printed pages becomes equal to or more than two, because of an image representing image data designated by a user to be printed being unable to be fitted in a first of printing pages;
an image processor that executes, with respect to the image data about which the first decider has decided that the number of printed pages becomes equal to or more than two, because of the image being unable to be fitted in the first of the printing pages, a processing including (i) separating a part of the image protruding from the first of the printing pages, from a fitted part of the image that can be fitted in the first of the printing pages, (ii) dividing the separated image into image segments according to a length of the fitted part of the image, and (iii) including the image segments in the image to be printed on the printing page, by aligning the divided image segments parallel to the fitted part of the image;
a notifier that notifies, when the first decider decides that the number of printed pages of the image data becomes equal to or more than two, the user to the same effect;
an instruction receiver that receives an instruction to execute the processing with respect to the image data from the user, after the notifier outputs the notice; and
a second decider that decides whether a width of the fitted part of the image is equal to or less than a predetermined ratio to an image forming region in the printing page,
wherein the image processor executes the processing with respect to the image data, when the instruction receiver has received the instruction to execute from the user, and
the notifier outputs the notice, when the second decider decides that the width of the fitted part of the image is equal to or less than the predetermined ratio to the image forming region in the printing page, but detains the notice when the second decider decides that the width of the fitted part of the image is not equal to or less than the predetermined ratio to the image forming region.

2. The information processing apparatus according to claim 1,
wherein the second decider sets the predetermined ratio to 1/2, and decides, on a basis of the image data, whether the width of the fitted part of the image that can be fitted in the first of the printing pages is 1/2 or less of the image forming region, the width corresponding to a length of shorter sides of the fitted part of the image, and a length of longer sides thereof corresponding to a length.

3. An information processing apparatus comprising:
a first decider that decides whether a number of printed pages becomes equal to or more than two, because of an image representing image data designated by a user to be printed being unable to be fitted in a first of printing pages;
an image processor that executes, with respect to the image data about which the first decider has decided that the number of printed pages becomes equal to or more than two, because of the image being unable to be fitted in the first of the printing pages, a processing including (i) separating a part of the image protruding from the first of the printing pages, from a fitted part of the image that can be fitted in the first of the printing pages, (ii) dividing the separated image into image segments according to a length of the fitted part of the image, and (iii) including the image segments in the image to be printed on the printing page, by aligning the divided image segments parallel to the fitted part of the image;

a notifier that notifies, when the first decider decides that the number of printed pages of the image data becomes equal to or more than two, the user to the same effect;

an instruction receiver that receives an instruction to execute the processing with respect to the image data from the user, after the notifier outputs the notice; and a third decider that decides whether a width of the part of the image protruding from the first of the printing pages is the same as a width of the fitted part of the image, wherein the image processor executes the processing with respect to the image data, when the instruction receiver has received the instruction to execute from the user, and the notifier detains the notice when the third decider decides that the width of the part of the image protruding from the first of the printing pages is not the same as the width of the fitted part of the image.

4. The information processing apparatus according to claim 1, further comprising a setting receiver that receives a setting, specified by the user, of an interval between the image segments adjacent to each other, to be applied when the image segments are aligned parallel to the fitted part of the image, wherein the image processor executes the processing according to the interval specified by the user and received by the setting receiver.

5. The information processing apparatus according to claim 1, wherein the image processor adds, when executing the processing, an image visually indicating continuity between a trailing end of a preceding image and a leading end of a following image, with respect to images aligned in parallel adjacent to each other.

6. The information processing apparatus according to claim 1, wherein the image processor copies, when executing the processing, a leading image or a trailing image of each of images aligned in parallel, adds the copy of the leading image to a trailing end of an image preceding the leading image, and adds the copy of the trailing image to a leading end of an image following the trailing image.

7. The information processing apparatus according to claim 6, wherein the image processor generates a copied image of the leading image, so as to facilitate visual distinction from the trailing image.

8. The information processing apparatus according to claim 1, wherein the image processor adds, when executing the processing, an image indicating which part in an entirety of the image before the separation each of the image segments aligned in parallel corresponds to, at a predetermined position with respect to each of the image segments.

9. The information processing apparatus according to claim 1, further comprising a print controller that causes the printing apparatus to print the image representing the image data, by outputting the image data processed by the image processor.

10. The information processing apparatus according to claim 3, wherein the image processor adds, when executing the processing, an image visually indicating continuity between a trailing end of a preceding image and a leading end of a following image, with respect to images aligned in parallel adjacent to each other.

11. The information processing apparatus according to claim 3, wherein the image processor copies, when executing the processing, a leading image or a trailing image of each of images aligned in parallel, adds the copy of the leading image to a trailing end of an image preceding the leading image, and adds the copy of the trailing image to a leading end of an image following the trailing image.

12. The information processing apparatus according to claim 3, further comprising a print controller that causes the printing apparatus to print the image representing the image data, by outputting the image data processed by the image processor.

13. A print control method comprising:

deciding, as a first decision, whether a number of printed pages becomes equal to or more than two, because of an image representing image data designated by a user to be printed being unable to be fitted in a first of printing pages;

executing, with respect to the image data about which it has been decided, as the first decision, that the number of printed pages becomes equal to or more than two, because of the image being unable to be fitted in the first of the printing pages, a processing including (i) separating a part of the image protruding from the first of the printing pages, from a fitted part of the image that can be fitted in the first of the printing pages, (ii) dividing the separated image into image segments according to a length of the fitted part of the image, and (iii) including the image segments in the image to be printed on the printing page, by aligning the divided image segments parallel to the fitted part of the image;

notifying, when it has been decided, as the first decision, that the number of printed pages of the image data becomes equal to or more than two, the user to the same effect;

receiving an instruction to execute the processing with respect to the image data from the user, after the notice has been outputted in the notifying; and deciding, as a second decision, whether a width of the fitted part of the image is equal to or less than a predetermined ratio to an image forming region in the printing page, wherein the processing with respect to the image data is executed in the executing the processing, when the instruction to execute has been received from the user in the receiving, and in the notifying, the notice is outputted when it has been decided, as the second decision, that the width of the fitted part of the image is equal to or less than the predetermined ratio to the image forming region in the printing page, but detains the notice when it has been decided, as the second decision, that the width of the fitted part of the image is not equal to or less than the predetermined ratio to the image forming region.

* * * * *